(12) United States Patent
Fukasawa

(10) Patent No.: US 8,879,084 B1
(45) Date of Patent: Nov. 4, 2014

(54) PRINTING SYSTEM AND PRINTING METHOD

(71) Applicant: Fuji Xerox Co., Ltd., Tokyo (JP)

(72) Inventor: Hajime Fukasawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/134,635

(22) Filed: Dec. 19, 2013

(30) Foreign Application Priority Data

Jun. 17, 2013 (JP) ................................. 2013-126898

(51) Int. Cl.
| | | |
|---|---|---|
| G06F 3/12 | (2006.01) | |
| G06K 15/00 | (2006.01) | |
| H04N 1/40 | (2006.01) | |
| H04N 1/60 | (2006.01) | |
| G06K 15/10 | (2006.01) | |

(52) U.S. Cl.
CPC ............ G06F 3/1215 (2013.01); G06F 3/1254 (2013.01); G06F 3/128 (2013.01); G06K 15/102 (2013.01); G06F 3/1247 (2013.01)
USPC ............ 358/1.13; 358/1.9; 358/2.1; 358/1.16

(58) Field of Classification Search
None
See application file for complete search history.

(56) References Cited

U.S. PATENT DOCUMENTS

| | | | |
|---|---|---|---|
| 2004/0179218 A1* | 9/2004 | Wissenbach | ................. 358/1.13 |
| 2006/0221371 A1* | 10/2006 | Ogasawara | ................. 358/1.13 |
| 2009/0153892 A1 | 6/2009 | Torii | |

FOREIGN PATENT DOCUMENTS

| | | |
|---|---|---|
| JP | 2001-134389 A | 5/2001 |
| JP | 2004-192507 A | 7/2004 |
| JP | 2009-146251 A | 7/2009 |

* cited by examiner

*Primary Examiner* — Thomas Lett
(74) *Attorney, Agent, or Firm* — Sughrue Mion, PLLC

(57) ABSTRACT

A printing system includes a first module, a second module, a third module, a system configuration controller, and a display controller. The first module receives job data and controls a printing processing process. The second module converts the job data into image data. The third module converts the image data into data in an appropriate format. The printer receives the data from the third module and performs printing. The system configuration controller is used to share system configuration information among the first, second, and third modules. The display controller displays a state of the printing system and receives an instruction for adding or an instruction for removing at least one of the second and third modules from a user. The system configuration controller executes addition or removal of a certain module in accordance with the addition or removal instruction received by the display controller.

12 Claims, 13 Drawing Sheets

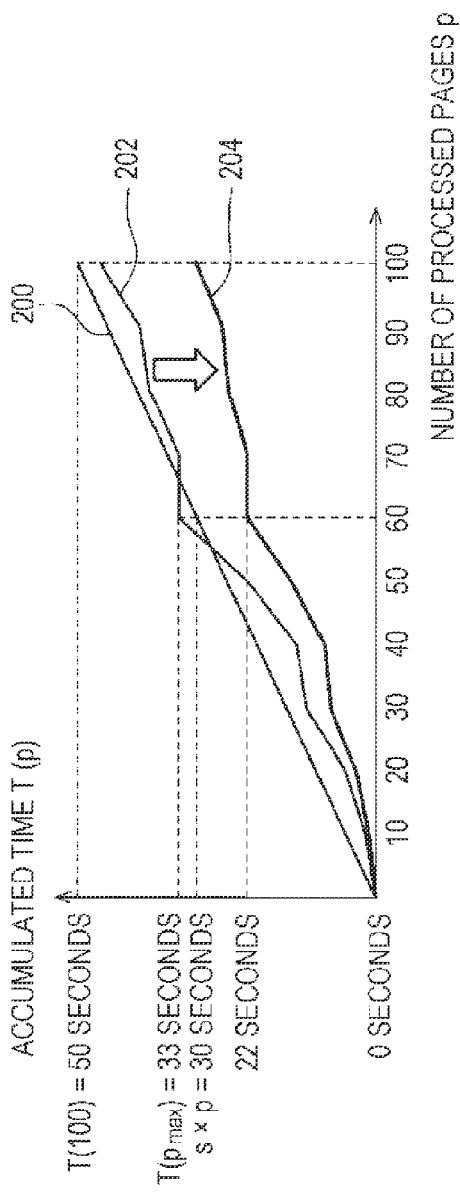

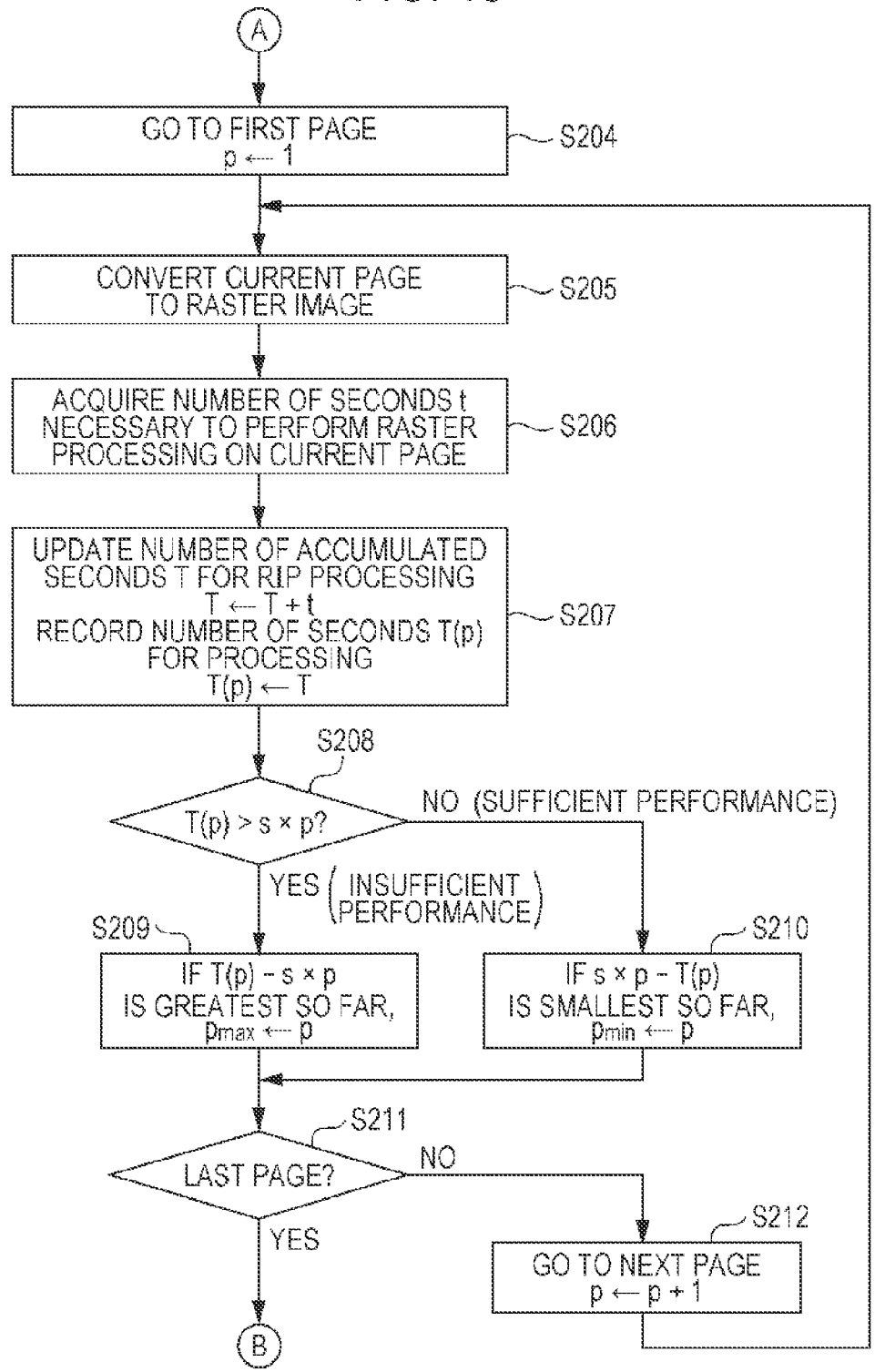

PRINTING SYSTEM AND PRINTING METHOD

CROSS-REFERENCE TO RELATED APPLICATIONS

This application is based on and claims priority under 35 USC 119 from Japanese Patent Application No. 2013-126898 filed Jun. 17, 2013.

BACKGROUND (i) Technical Field

The present invention relates to a printing system and a printing method.

(ii) Related Art

In a production printing system, the processing speed in a marking technology such as inkjet has been increasing. In particular, high speed printing faster than 2500 ppm (pages per minute) is put to practical use in a printing system for continuous paper. As a marking technology has been improving, it is desired that the speed of processing for generating a raster image of print job data be increased, the processing being performed by a raster image processor (RIP). The performance of an RIP greatly depends on the performance of the central processing unit (CPU) of hardware.

Recently, print data has been expressed in full colors and has been realizing higher resolution. The required throughput for full-color (CMYK) data is four times faster than that for black and white gray-scale data as a result of simple calculation. In addition, when a resolution is doubled, the size of image data is quadrupled. From this time forward, the required RIP throughput necessary for a system controller tends to be higher.

When RIP processing takes a longer time than expected, generation of an image does not keep up with the output speed of a printer. In particular, in the case where a printing system for continuous paper once starts running, the printing system is incapable of stopping operation immediately. Thus, if generation of an image to be printed is not completed in time, a piece of blank paper is output. This is not only a waste of paper but also is troublesome because unnecessary pieces of blank paper need to be removed in a postprocessing process. Thus, blank paper is preferably prevented from being output.

In the case where the CPU of a system controller is changed to a faster one, although the RIP processing speed increases, the manufacturing cost also increases. On the other hand, there is a method (in-advance raster image processing (RIP)) for performing RIP on all job data in advance before printing is started. According to this method, an issue in that RIP processing is not completed in time does not occur.

In a print place where a large number of bills and the like are output consecutively, first, part of the job is extracted and test printing is performed on the extracted part before performing actual printing on a certain job. Here, it is checked whether or not no errors occur due to a page description language (PDL) of the job and it is also checked whether or not processing will be completed in time without performing in-advance RIP. In accordance with this result, whether or not to perform in-advance RIP may be determined and, thereafter, a task process of actual printing of the entire job may be performed.

However, in the case where in-advance RIP is performed, there is an issue in that an additional time is necessary to perform RIP processing on all job data in advance. In addition, a storage device such as a hard disk drive (HDD) is necessary to temporarily store generated image data. In a production printing system, there may be many cases where several tens of thousands to several hundreds of thousands of pages are consecutively printed. The necessary storage capacity may exceed several tens of gigabytes (GB). Thus, direct printing is preferably performed without performing in-advance RIP, if possible, in terms of work time and cost.

SUMMARY

According to an aspect of the invention, there is provided a printing system including a first module, a second module, a third module, a system configuration controller, and a display controller. The first module receives job data and controls a printing processing process. The second module converts the job data into image data. The third module converts the image data into data in a format appropriate for printing. The printer receives data from the third module and performs printing. The system configuration controller is used to share system configuration information among the first, second, and third modules. The display controller displays a state of the printing system in accordance with the system configuration information and receives an addition instruction for adding or a removal instruction for removing at least one of the second module and the third module from a user, the system configuration controller having the system configuration information. The system configuration controller executes addition or removal of a certain module among the second and third modules in accordance with the addition instruction or the removal instruction received by the display controller.

BRIEF DESCRIPTION OF THE DRAWINGS

An exemplary embodiment of the present invention will be described in detail based on the following figures, wherein:

FIG. 12 is a diagram for an explanation of RIP-module addition processing according to the exemplary embodiment;

FIG. 13 is a diagram for an explanation of RIP-module removal processing according to the exemplary embodiment;

FIG. 15 is a flowchart (part 2) of the addition/removal processing according to the exemplary embodiment.

DETAILED DESCRIPTION

In the following, an exemplary embodiment of the present invention will be described with reference to the drawings.

Figure 1:
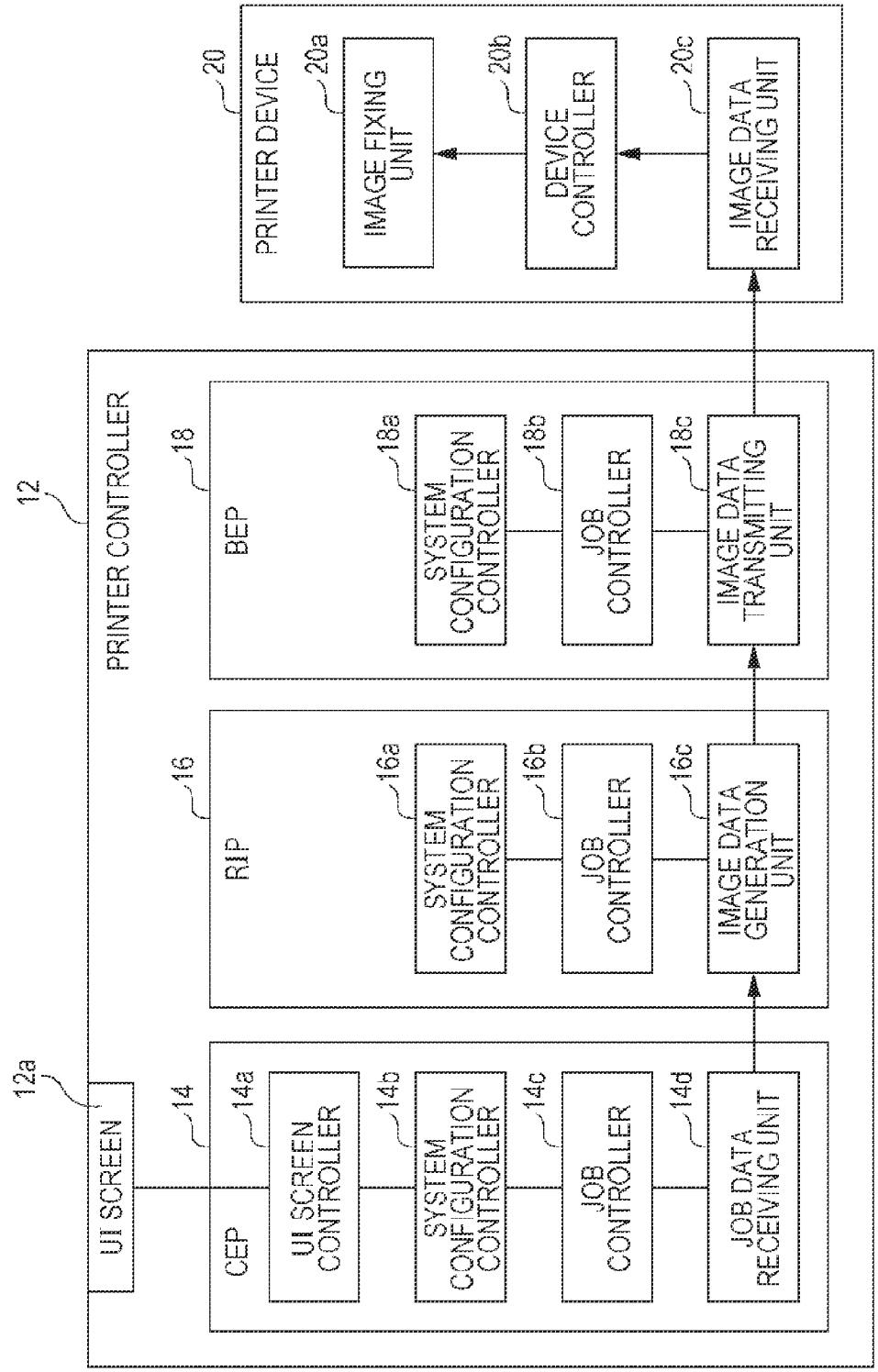
FIG. 1 is a block diagram of a configuration according to an exemplary embodiment.

FIG. 1 illustrates the configuration of a printing system according to this exemplary embodiment. The printing system includes a printer controller 12 and a printer device 20.

The printer controller 12 includes a center processor (CEP) module 14 serving as a first module, a raster image processor (RIP) module 16 serving as a second module, and a back end processor (BEP) module 18 serving as a third module. The modules are connected to one another via a network or the like, and transmit and receive various kinds of data including print job data to and from one another. In addition, the printer controller 12 includes a user interface (UI) screen 12a, which is operable by a user (an operator).

The CEP module 14 includes a UI screen controller 14a, a system configuration controller 14b, a job controller 14c, and a job data receiving unit 14d. The job data receiving unit 14d receives job data of a print job from a client personal computer (PC). The job controller 14c performs scheduling of the flow of the entire printing process in accordance with job data. The UI screen controller 14a displays a system state in accordance with data from the job controller 14c, or receives a user (operator) operation and outputs the user (operator) operation to the job controller 14c. The system configuration controller 14b stores configuration information on the entire system such as addresses and the like of connected modules.

The RIP module 16 includes a system configuration controller 16a, a job controller 16b, and an image data generation unit 16c. The image data generation unit 16c analyzes the content of job data and converts the job data into image data in an appropriate format. The job controller 16b communicates with the CEP module 14 and the BEP module 18 and performs scheduling of a printing process. The system configuration controller 16a stores configuration information on the entire system such as addresses and the like of connected modules.

The BEP module 18 includes a system configuration controller 18a, a job controller 18b, and an image data transmitting unit 18c. The image data transmitting unit 18c converts image data into data in a format appropriate for the printer device 20 by performing color conversion processing or the like and outputs the resulting data to the printer device 20. The job controller 18b performs scheduling of a printing process by communicating with the CEP module 14 and the RIP module 16. The system configuration controller 18a stores configuration information on the entire system such as addresses and the like of connected modules.

The printer device 20 includes an image fixing unit 20a, a device controller 20b, and an image data receiving unit 20c. The image data receiving unit 20c receives image data from the BEP module 18 and outputs the image data to the device controller 20b. The device controller 20b controls the image fixing unit 20a, and the image fixing unit 20a prints an image on a sheet.

In this manner, the CEP module 14, the RIP module 16, and the BEP module 18 include the system configuration controllers 14b, 16a, and 18a, respectively, and share addresses and the like of connected modules. The system configuration controllers 14b, 16a, and 18a have an ID unique to a system (a system ID), and recognize one another in the same system using this ID. Here, for plural systems, each system has a unique system ID. Note that plural systems having different system IDs may exist in the same network; however, each system is identified by such an ID also in this case.

The CEP module 14, the RIP module 16, and the BEP module 18 may operate on the same piece of hardware or may operate on different pieces of hardware. In the case of achieving low cost, all the modules 14, 16, and 18 are operated on the same piece of hardware. In the case of achieving high speed performance, all the modules 14, 16, and 18 are operated on different pieces of hardware and processing load is distributed.

Figure 2:
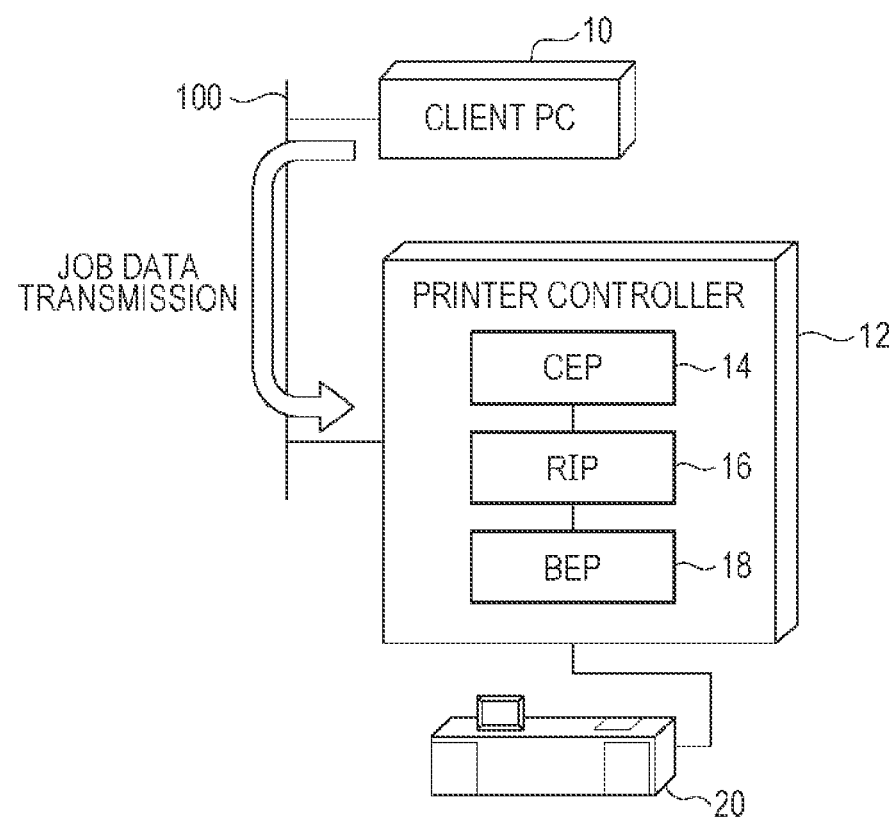
FIG. 2 is a diagram of a system configuration according to the exemplary embodiment.

FIG. 2 illustrates a configuration in the case where the CEP module 14, the RIP module 16, and the BEP module 18 are operated on the same piece of hardware. The CEP module 14, the RIP module 16, and the BEP module 18 are included in a printer controller 12. A client PC 10 and the printer controller 12 are connected via a network 100, and a print job from the client PC 10 is transmitted to the printer controller 12.

Figure 3:
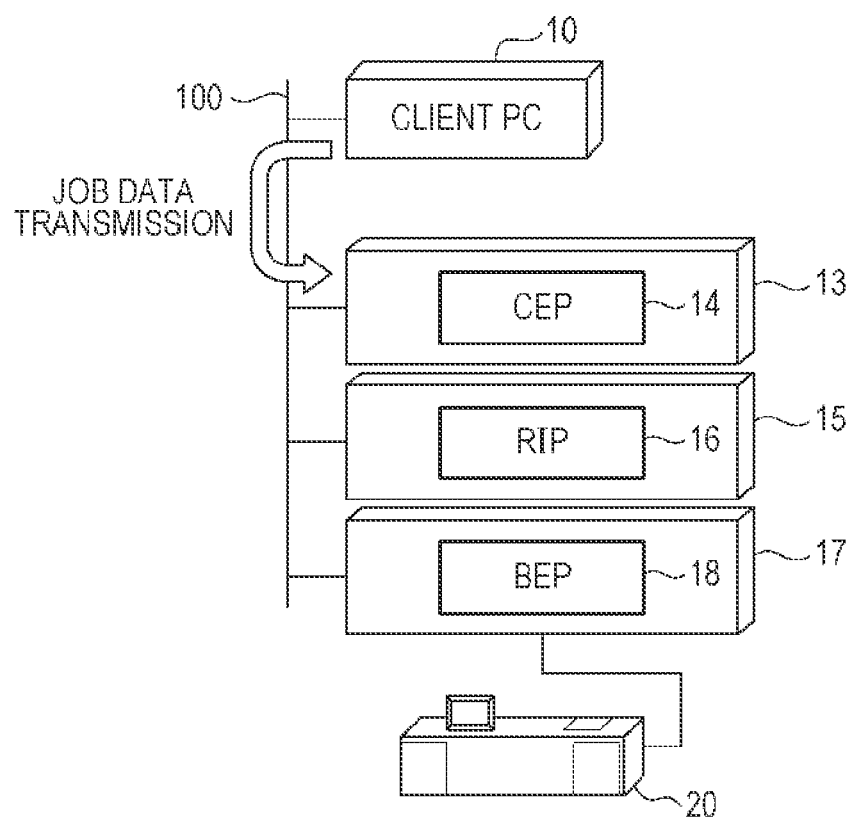
FIG. 3 is a diagram of another system configuration according to the exemplary embodiment.

FIG. 3 illustrates a configuration in the case where the CEP module 14, the RIP module 16, and the BEP module 18 are operated on different pieces of hardware. The CEP module 14, the RIP module 16, and the BEP module 18 are included in different printer controllers 13, 15, and 17, respectively. The client PC 10 and the printer controllers 13, 15, and 17 are connected to one another via the network 100, and a print job from the client PC 10 is transmitted to each of the printer controllers 13, 15, and 17.

Figure 4:
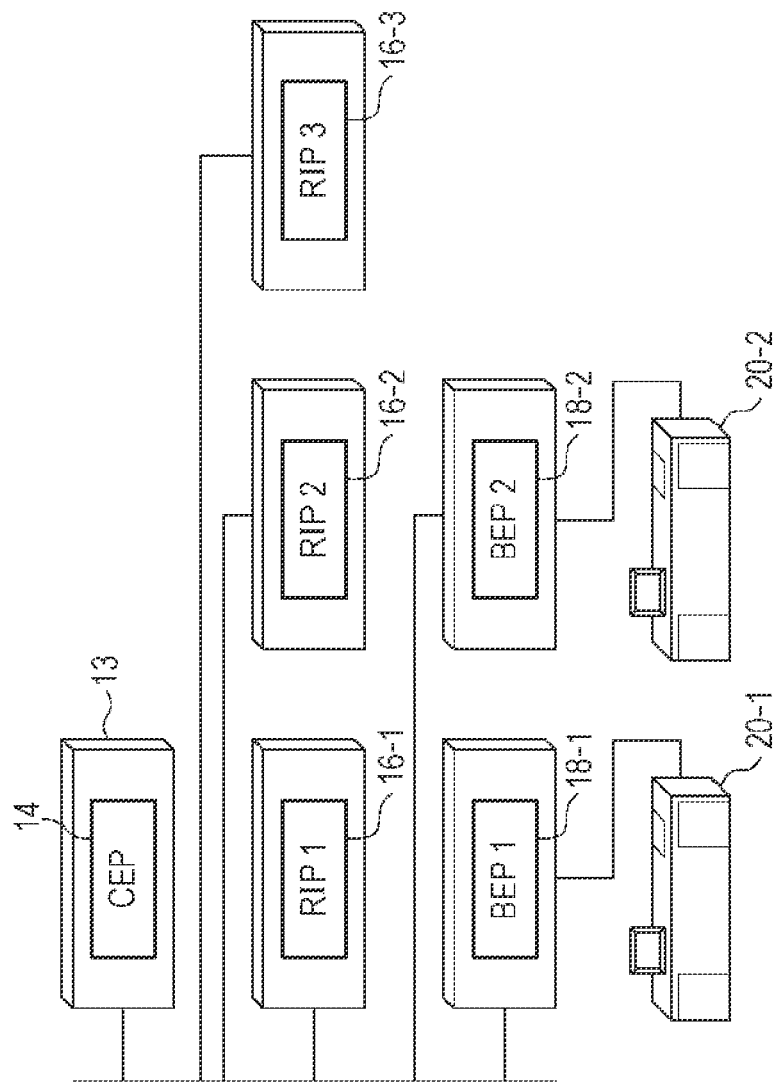
FIG. 4 is a diagram of a configuration in the case where plural RIP modules according to the exemplary embodiment are included.

FIG. 4 illustrates another configuration in the case where the CEP module 14, the RIP module 16, and the BEP module 18 are operated on different pieces of hardware. It is a case where plural RIP modules 16 and plural BEP modules 18 are used. As the RIP modules 16, an RIP1 module 16-1, an RIP2 module 16-2, and an RIP3 module 16-3 are included in different printer controllers, each of which includes a corresponding one of the RIP1 module 16-1, the RIP2 module 16-2, and the RIP3 module 16-3. In addition, as the BEP modules 18, a BEP1 module 18-1 and a BEP2 module 18-2 are included in different printer controllers, each of which includes a corresponding one of the BEP1 module 18-1 and the BEP2 module 18-2. In the case where plural BEP modules 18 are used, printer devices 20 are connected to the BEP modules 18. A printer device 20-1 is connected to the BEP1 module 18-1, and a printer device 20-2 is connected to the BEP2 module 18-2.

The CEP module 14 constantly monitors processing load of the RIP1 module 16-1, RIP2 module 16-2, and RIP3 module 16-3 in the system, and the CPU assigns new RIP processing to an unused RIP module. As a result, for each page, image generation processing is performed in a distributed manner by the RIP1 module 16-1, RIP2 module 16-2, and RIP3 module 16-3, thereby improving RIP throughput of the system. Thus, in the case where RIP modules additionally necessary for the job are added, in-advance RIP is unnecessary, thereby improving operation efficiency of the system.

In addition, as a destination to which a job is output, the CEP module 14 selects either the BEP1 module 18-1 or the BEP2 module 18-2 in the system, in accordance with a user instruction. That is, a user (an operator) may arbitrarily select one of the printer devices 20-1 and 20-2 for output. The CEP module 14 controls the BEP1 module 18-1 and the BEP2 module 18-2 such that output is performed by a printer device selected by the user. Selection of a printer device for output may be performed through the UI screen 12a, an example of which is an option specifying screen or the like.

In this manner, one system may include plural RIP modules 16 and plural BEP modules 18. In this exemplary embodiment, furthermore, the number of RIP modules 16 and that of BEP modules 18 may be arbitrarily increased or decreased, the RIP modules 16 and the BEP modules 18 constituting the system.

Figure 5:
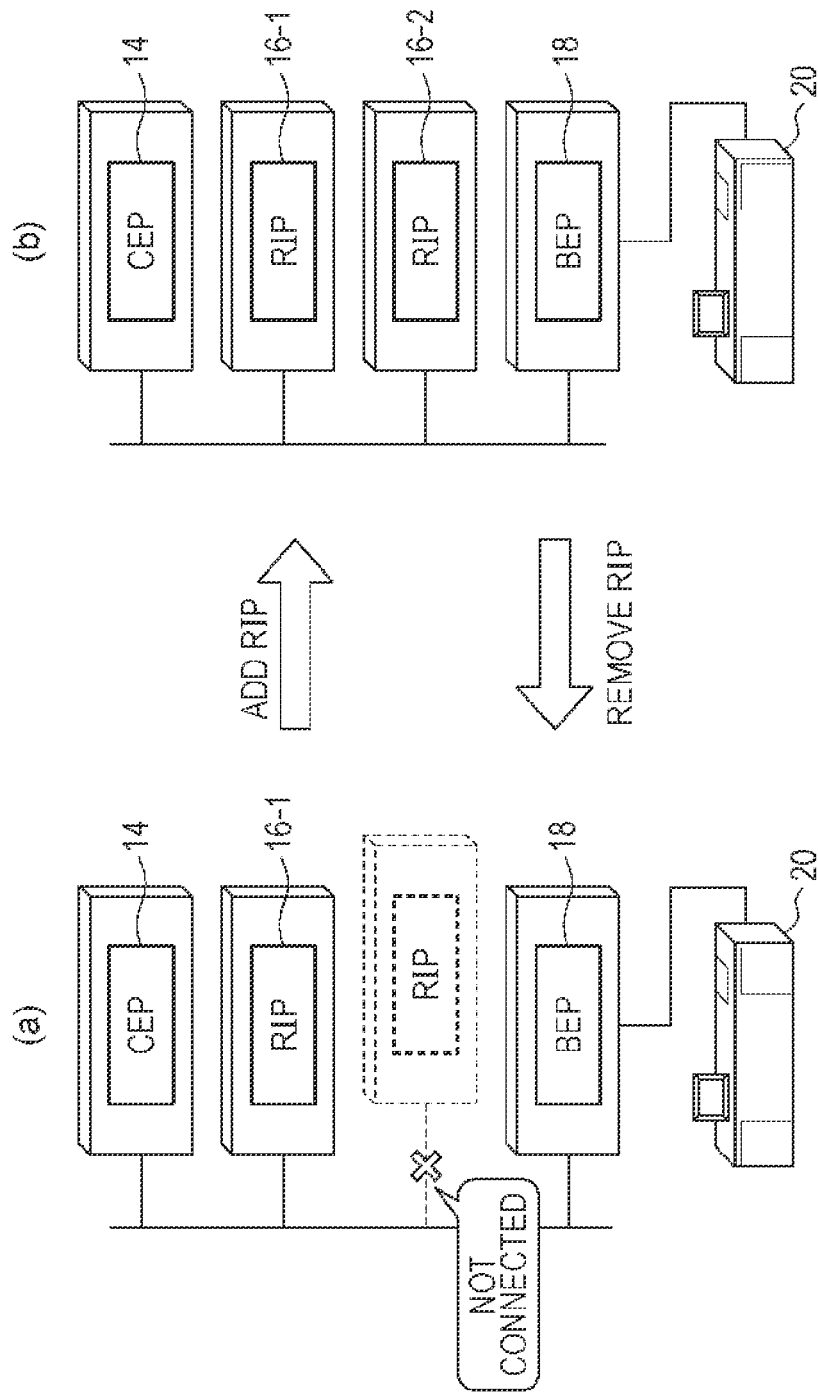
FIGS. 5A and 5B are diagrams for an explanation of addition/removal of an RIP module according to the exemplary embodiment.

FIGS. 5A and 5B illustrate a configuration in the case where an RIP module 16 is added or removed. As illustrated in FIG. 5A, suppose that one system includes the CEP module 14, an RIP module 16-1, and the BEP module 18. In the case where an RIP module 16-2 is newly added, system-ID information is set in the system configuration controller 16a of the RIP module 16-2 to be added and the CEP module 14 is caused to recognize the RIP module 16-2, which is a newly added RIP module. The CEP module 14 recognizes the RIP module 16-2 as an RIP module in the same system from the system-ID information of the RIP module 16-2, and registers the address of the RIP module 16-2 in the system. FIG. 5B illustrates a configuration in the case where the RIP module 16-2 has been newly added.

In contrast, in the case where the RIP module 16-2 is removed from the configuration illustrated in FIG. 5B, the system ID information is removed from the system configuration controller 16a of the RIP module 16-2 to be removed, and the address of the RIP module 16-2 registered in the CEP module 14 is also removed. As a result, the configuration returns to the state illustrated in FIG. 5A and the RIP module 16-2 is separated from the system.

In addition, the CEP module 14 may acquire not only system configuration information on the system to which the CEP module 14 belongs but also system configuration information on other systems reachable via a network. In this case, the CEP module 14 acquires the number, types, and the like of RIP modules 16 and those of BEP module 18 included in the other systems. Specifically, when a user specifies a broadcast address or a search destination address using the UI screen 12a, the CEP module 14 transmits an information-inquiry packet to the specified address. Another system that has received the information-inquiry packet returns, to the CEP module 14, information on modules (the number of modules and the types of modules) included in the other system. The CEP module 14 determines a connection state of modules of the other system by acquiring the returned information from the other system. By determining a state of the other system, an RIP module 16 may be moved to and from the other system.

Figure 6:
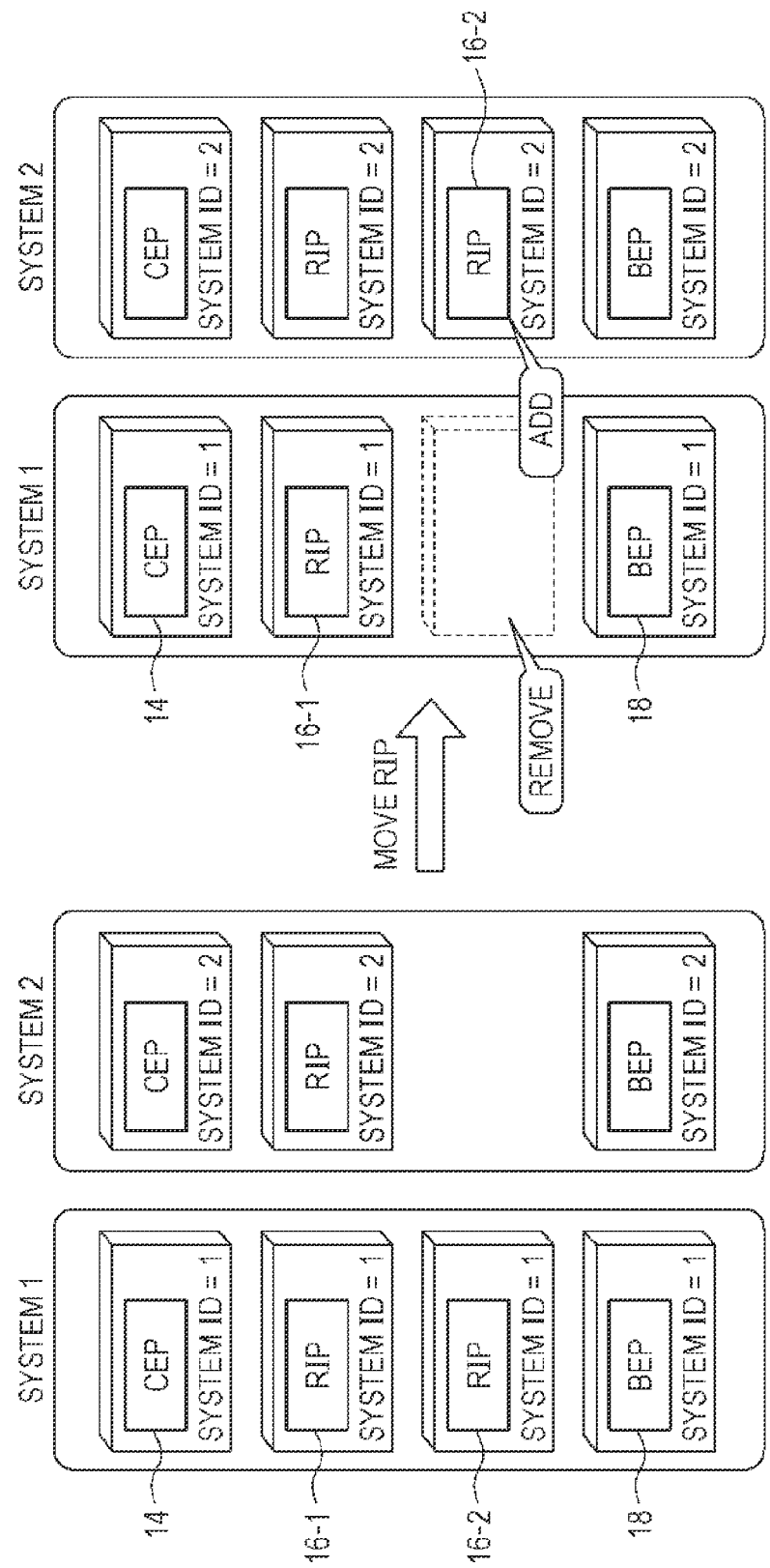
FIG. 6 is a diagram for an explanation of movement of an RIP module between systems according to the exemplary embodiment.

FIG. 6 illustrates movement of an RIP module 16 to and from another system. There are systems, a system 1 and a system 2. The system 1 includes a CEP module 14, two RIP modules 16-1 and 16-2, and a BEP module 18. The system 2 includes a CEP module, an RIP module, and a BEP module. The system ID of the system 1 is ID=1. This system ID is registered in system configuration controllers of all modules in the system 1. The system ID of the system 2 is ID=2. This system ID is registered in system configuration controllers of all modules in the system 2.

In the case where the throughput of the system 1 is sufficient for performing RIP processing and, in contrast, the throughput of the system 2 is insufficient for performing RIP processing, among the two RIP modules 16-1 and 16-2 in the system 1, the RIP module 16-2 is moved to the system 2 by rewriting the system ID of the RIP module 16-2 from ID=1 to ID=2. In addition, the address of the moved RIP module 16-2 is removed from the CEP module 14 in the system 1 and the address of the moved RIP module 16-2 is added to the CEP module in the system 2. As a result, the CEP module in the system 2 may improve processing efficiency by assigning RIP processing to two RIP modules. Whether or not the throughput of the system 1 is sufficient for performing RIP processing or the throughput of the system 2 is insufficient for performing RIP processing may be determined by a user (an operator). Alternatively, the CEP modules of the systems 1 and 2 may perform determination and display the determination result on the UI screen 12a. Processing in this case will be described later.

In the following, processing according to this exemplary embodiment will be described in more detail.

Figure 7:
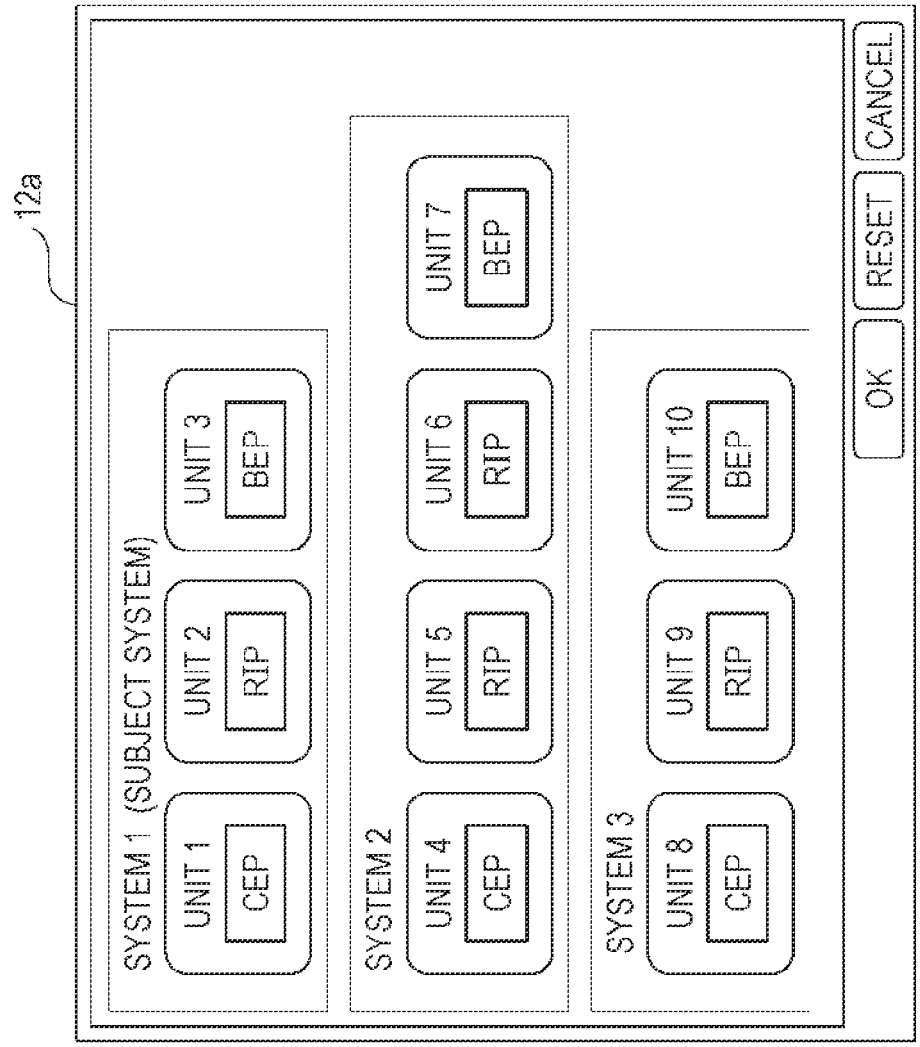
FIG. 7 is a diagram for an explanation of a UI screen according to the exemplary embodiment.

FIG. 7 illustrates an example of an operation screen displayed on the UI screen 12a by the UI screen controller 14a of the CEP module 14. This is an example of a screen in the case where there is not only a subject system (the system 1) but also other systems (the system 2 and a system 3) in the network.

The UI screen controller 14a of the CEP module 14 of the subject system displays, using icons, the numbers and statuses (printing/idle or the like) of CEP modules 14, RIP modules 16, and BEP modules 18 constituting the subject system in accordance with information stored in the system configuration controller 14b. Detail information on hardware (a CPU, a HDD, a RAM, and the like) of modules may be displayed in a method such as a tooltip. In addition, not only the numbers and statuses of modules in the subject system (the system 1) but also the numbers and statuses of CEP modules 14, RIP modules 16, and BEP modules 18 constituting other systems reachable via a network (the systems 2 and 3) are displayed using icons and arranged on the same screen. FIG. 7 illustrates that the system 2 includes two RIP modules 16 and one BEP module 18, and the system 3 includes one RIP module 16 and one BEP module 18. The color of icons may differ from system to system or from module to module.

A user may easily know not only the status of modules in the subject system but also the status of modules in other systems by viewing such a screen. This also makes it easy to move an arbitrary RIP module or an arbitrary BEP module in a certain system to another system. For example, to issue a movement instruction, the icon of a subject module is preferably moved by performing a drag-and-drop operation on the UI screen 12a. A drag-and-drop operation is a known operation for personal computers, tablet terminals, smartphones, and the like.

Figure 8A:
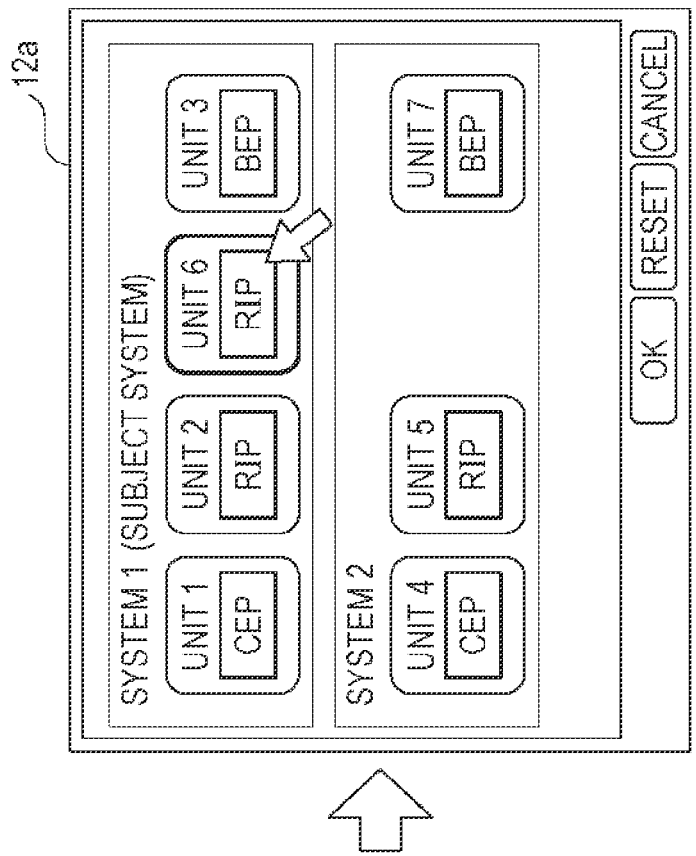
FIGS. 8A and 8B are diagrams for an explanation of an instruction to move an RIP module between systems according to the exemplary embodiment.
Figure 8B:
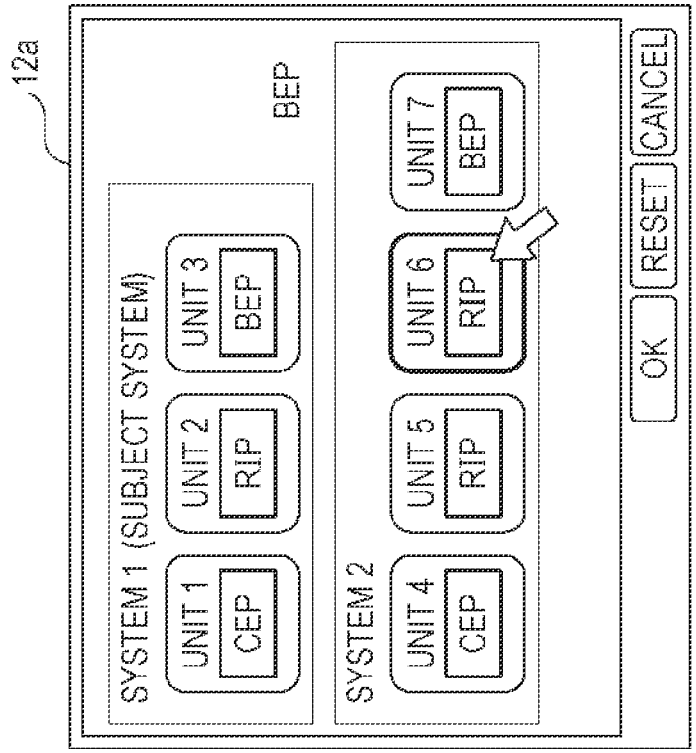

FIGS. 8A and 8B illustrate a case where an RIP module 16 in another system is moved to the subject system. FIG. 8A illustrates a screen obtained before movement and FIG. 8B illustrates a screen obtained after movement. The icon of one of the two RIP modules 16 in the system 2 is selected and moved to a portion between the icon of the RIP module and that of the BEP module in the system 1 by performing a drag-and-drop operation. In this state, when an "OK" button displayed at the bottom right of the UI screen 12a is operated and confirmation is given, the system configuration controllers 14b of the CEP modules 14 notify the system 2, a system from which the RIP module 16 is moved, and the system 1, to which the RIP module 16 is moved, of details of a change and update the configurations of both systems simultaneously. That is, the system ID of the system configuration controller 16a of the RIP module 16, a movement target, is rewritten from the ID of the system 2 to the ID of the system 1, and the address of the RIP module 16, the movement target, is registered in the system configuration controller 14b of the CEP module 14 of the system 1 and is removed from the system configuration controller 14b of the CEP module 14 of the system 2.

Note that such movement is not allowed while the system is printing. Thus, in the case where a user inputs a system configuration change instruction on the UI screen 12a, the system configuration controller 14b of the CEP module 14 in the subject system determines whether or not systems are printing a job. In the case where any of the systems is printing, preferably, change processing is suspended and error processing is performed. In this case, movement processing is on standby until printing is completed, and movement is executed after the printing processing is completed.

FIGS. 8A and 8B illustrate movement of the RIP module 16, and the BEP module 18 may also be moved likewise.

Figure 9:
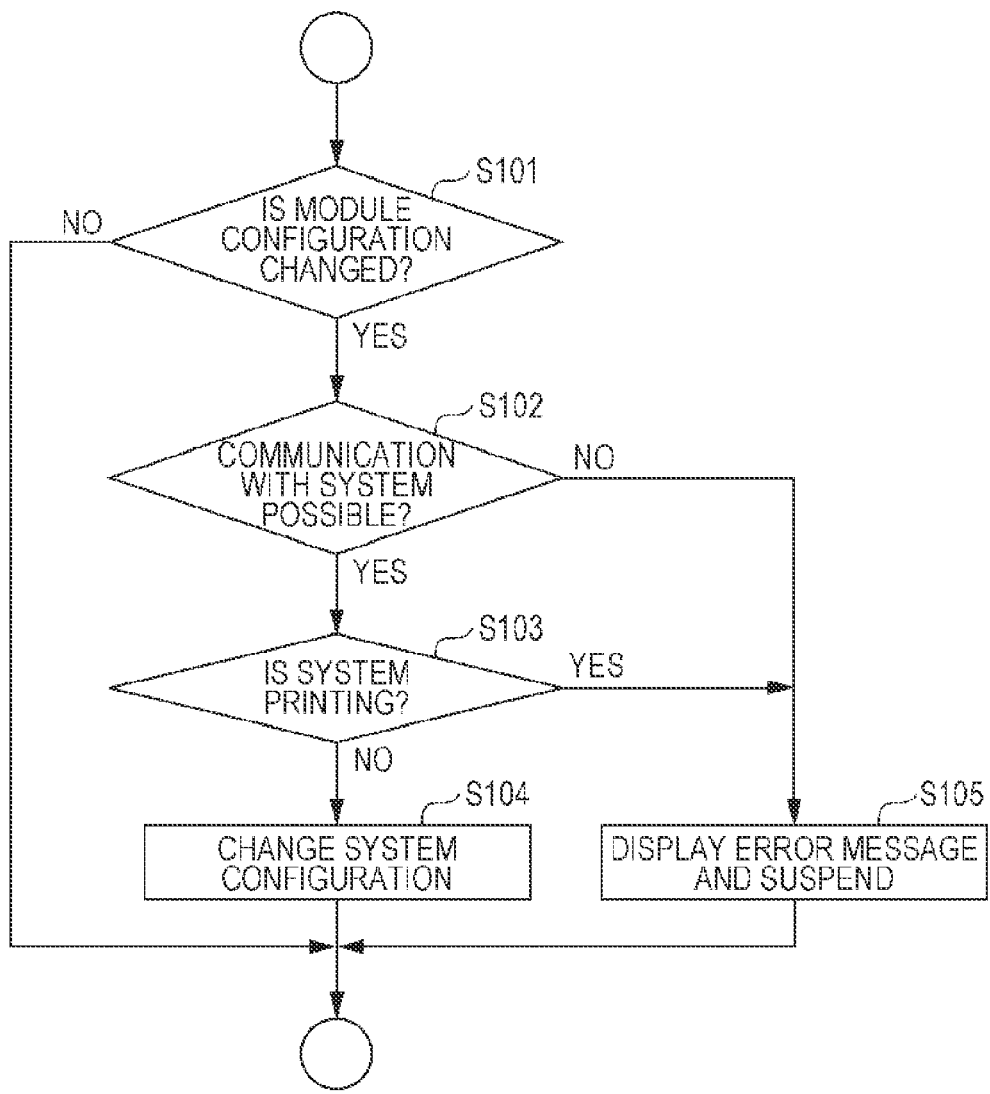
FIG. 9 is a flowchart of processing according to the exemplary embodiment.

FIG. 9 illustrates a flowchart of processing performed when a module is moved. First, the CEP module 14 of the subject system determines whether or not module configuration is changed by a user using the UI screen 12a (S101). For example, in the case where a drag-and-drop operation is performed on an RIP module 16 of another system to the subject system and an OK button is operated, it is determined that module configuration is changed.

Next, the CEP module 14 determines whether or not it is possible to communicate with a CEP module 14 of another system (S102). In the case where it is possible to communicate with the other system, furthermore, it is determined whether or not the other system is printing (S103). Whether or not the other system is printing is managed by the CEP module 14 of the other system. In the case where both the subject system and the other system are not printing, a change in system configuration is allowed (S104). In contrast, in the case where it is not possible to communication with the other system and the status of the other system is unknown or in the case where either of the subject system and the other system is printing, an error message is displayed and changing of the system configuration is suspended (S105).

Note that the CEP module 14 determines whether or not the changed configuration is valid even when it is possible to communicate with the other system and the subject system and the other system are not printing. In the case where a system with the changed configuration does not operate as a printer system, an error message may be displayed and changing of the system configuration may be suspended. For example, image generation processing becomes inoperative in the case where there are no RIP modules 16 after movement in a certain system, thereby displaying an error message or the like. Also in the case where there are no BEP modules 18 after movement, similar processing is performed.

In addition, the system configuration controller 14b of the CEP module 14 may constantly monitor processing load of the RIP modules belonging to the system on an individual basis while the system is performing RIP processing on a certain job and is performing output processing. The system configuration controller 14b of the CEP module 14 may estimate the minimum number of RIP modules necessary for performing RIP processing on the job from the record of processing load and the print speed of the printer device 20 (for example, 100 ppm), and may display the estimation result on the UI screen 12a. For example, "In-advance RIP is unnecessary for this job by adding another RIP module." or the like may be displayed.

Figure 10:
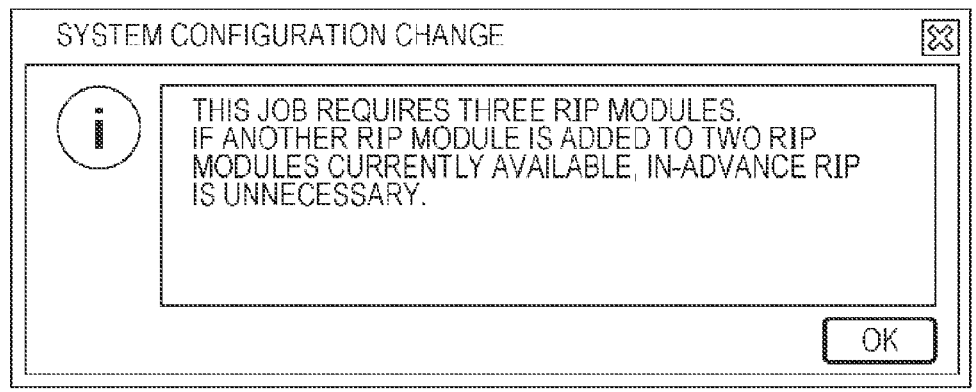
FIG. 10 is a diagram for an explanation of a screen according to the exemplary embodiment.

FIG. 10 illustrates an example of display of the UI screen 12a in this case. As system configuration change information, a message "This job requires three RIP modules. If another RIP module is added to two RIP modules currently available, in-advance RIP is unnecessary." is displayed. A user (an operator) may determine, by viewing this display, whether or not to add an RIP module from another system by performing a drag-and-drop operation.

In addition, in contrast, in the case where a sufficient amount of the processing performance of RIP modules currently available is still available, the system configuration controller 14b of the CEP module 14 may display a message indicating the minimum number of RIP modules necessary for processing. For example, "One RIP module is sufficient for this job. If one of three RIP modules currently available is stopped, a power consumption of 300 W may be reduced." or the like may be displayed.

Figure 11:
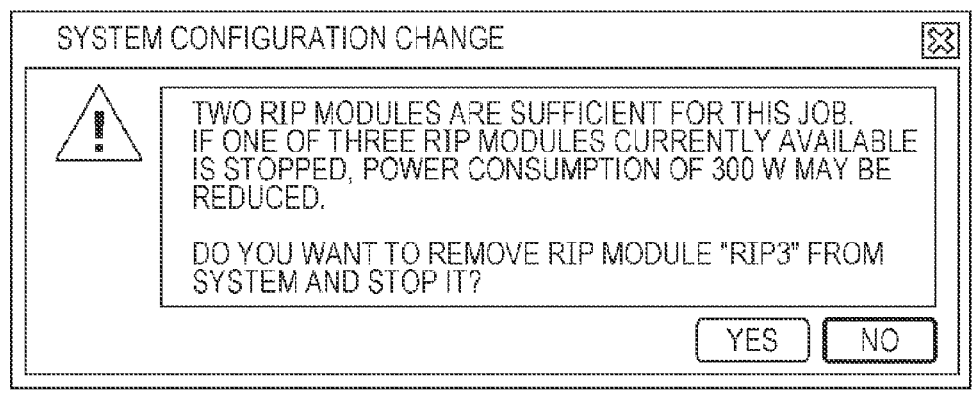
FIG. 11 is a diagram for an explanation of another screen according to the exemplary embodiment.

FIG. 11 illustrates an example of display of the UI screen 12a in this case. As system configuration change information, a message "Two RIP modules are sufficient for this job. If one of three RIP modules currently available is stopped, a power consumption of 300 W may be reduced." is displayed and a message "Do you want to remove an RIP module "RIP3" from the system and stop it?" for leading a user to remove the RIP module is displayed. In response to this message, when a user operates a YES button, the RIP module "RIP3" is separated from the subject system and stopped. Also in this case, as a precondition, the remaining two RIP modules may execute a print job without performing in-advance RIP.

FIG. 12 illustrates processing for displaying the message illustrated in FIG. 10. In FIG. 12, the horizontal axis represents the number of processed pages p and the vertical axis represents accumulated time $T(p)$. When the number of RIP modules 16 in the system is denoted by r and the number of seconds necessary for the printer device 20 to output one page is denoted by s, the printer device 20 needs s×p seconds to print p pages. Here, if an RIP processing time exceeds s×p seconds at an arbitrary page, RIP processing is not completed in time. During printing of a job, the system configuration controller 14b of the CEP module 14 records, every time each page p is processed, the number of seconds $T(p)$ necessary to perform RIP processing on pages 1 to p. Among pages whose number of seconds $T(p)$ is greater than the print speed (s×p) of the printer device 20, a page $p_{max}$ having the greatest delayed time $$T(p)-s\times p$$

is determined. FIG. 12 illustrates that the delayed time for RIP processing is greatest at $p_{max}$=page 60. When a margin of a processing time is denoted by m %, the smallest integer n that satisfies $$T(p_{max})\times(r/(r+n))<s\times p_{max}\times(1-m)$$

is the number of RIP modules to be added. In FIG. 12, when $T(p_{max})$=33 seconds, the number of RIP modules currently available is r=2, the print speed of the printer device 20 is 120 pages/min and 0.5 seconds/page, $p_{max}$=page 60, and a margin m=10%, the smallest integer n that satisfies $$33\times(2/(2+n))<0.5\times60\times(1-0.1)$$

is n=1. In addition to the RIP modules 16 currently available, another RIP module 16 is preferably added. In FIG. 12, a solid line 200 represents the print speed of the printer device 20, a solid line 202 represents an RIP accumulated time in the case of two RIP modules, and a solid line 204 represents an RIP accumulated time in the case of three RIP modules. FIG. 12 illustrates that although a delay occurs in the case of two RIP modules 16, a delay does not occur when three RIP modules 16 are used by adding another RIP module 16 (this addition is represented by a downward arrow in FIG. 12). As described above, by using three RIP module 16 as a result of addition of another RIP module 16, for subsequent print jobs, printing may be performed without performing in-advance RIP.

In addition, FIG. 13 illustrates processing performed to display a message illustrated in FIG. 11. Similarly to FIG. 12, the horizontal axis represents the number of processed pages p and the vertical axis represents accumulated time $T(p)$. When the number of RIP modules 16 in the system is denoted by r and the number of seconds necessary for the printer device 20 to output one page is denoted by s, the printer device 20 needs s×p seconds to print p pages. When an RIP processing time is smaller than s×p at every page, this means that the RIP module or modules have sufficient RIP throughput. During printing of a job, the system configuration controller 14b records, every time each page p is processed, the number of seconds T(p) necessary to perform RIP processing on pages 1 to p. A page $p_{min}$ having the smallest surplus processing time s×p−T(p) is determined. FIG. 13 illustrates that the system has the smallest surplus RIP performance at $p_{min}$=page 60. When a margin of a processing time is denoted by m %, the greatest integer n that satisfies $$T(p_{min}) \times (r/(r-n)) \leq s \times p_{min} \times (1-m)$$

is the number of RIP modules possible to be removed. In FIG. 13, when $T(p_{min})$=16 seconds and the number of RIP modules currently available is r=3, the greatest integer n that satisfies $$16 \times (3/(3-n)) \leq 0.5 \times 60 \times (1-0.1)$$

is n=1, thereby preferably removing one RIP module 16. In FIG. 13, a solid line 206 represents an RIP accumulated time in the case of three RIP modules 16 and a solid line 208 represents an RIP accumulated time in the case of two RIP modules 16. FIG. 13 illustrates that although three RIP modules 16 are surplus, two RIP modules 16 are necessary and sufficient as a result of removal of one RIP module 16 (the removal is represented by an upward arrow in FIG. 13).

Note that, in the case where a RIP module 16 is removed, the number of seconds of a surplus processing time is always smallest just after printing is started. Thus, $p_{min}$ is preferably determined after printing is performed to a certain degree. That is, recording of $p_{min}$ is preferably started after a certain period of time has elapsed from the start of printing.

Figure 14A:
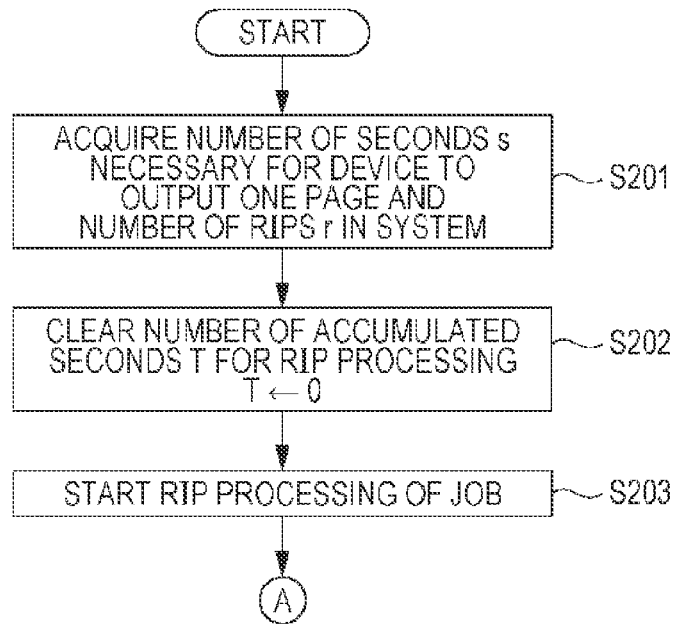
FIGS. 14A and 14B are flowcharts (part 1) of addition/removal processing according to the exemplary embodiment.

FIGS. 14A to 15 illustrate a detailed flowchart of addition/removal processing of an RIP module 16 according to this exemplary embodiment. This is processing executed by the system configuration controller 14b of the CEP module 14.

First, in FIG. 14A, the system configuration controller 14b acquires the number of seconds s necessary for the printer device 20 to output one page and the number r of RIP modules 16 in the system (S201).

Next, the number of accumulated seconds T for RIP processing is cleared to 0 and initialized (S202), and RIP processing of a job is started (S203).

Next, the procedure proceeds to processing in FIG. 15. A page variable p is set to 1 by going to page 1 (S204). A current page is converted into a raster image (S205). The number of seconds t necessary to perform raster processing on the current page is acquired (S206), and the number of accumulated seconds T for RIP processing is updated (S207). That is, the number of accumulated seconds T is updated as a result of addition of the number of seconds t. In addition, the number of seconds T(p) for processing is recorded.

Next, the acquired number of seconds T(p) for processing is compared with s×p as to which is greater or smaller (S208). When T(p)>s×p, it is determined that the RIP module or modules do not have sufficient processing performance. When T(p)≤s×p, it is determined that the RIP module or modules have sufficient processing performance.

When T(p)>s×p, it is determined whether or not T(p)−s×p is greatest so far. When YES, $p_{max}$ is set to a current p and recorded (S209).

In contrast, when T(p)≤s×p, it is determined whether or not s×p−T(p) is smallest so far. When YES, $p_{min}$ is set to a current p and recorded (S210). The above-described processing is repeatedly executed to the last page (S211 and S212). Thereafter, the procedure proceeds to processing in FIG. 14B.

Figure 14B:
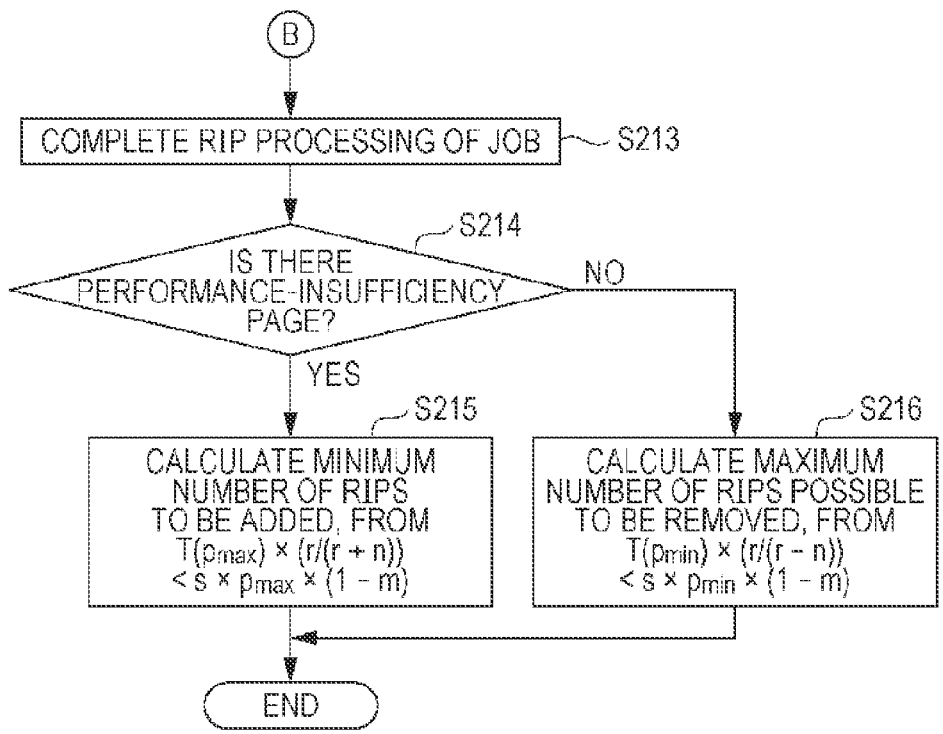

In FIG. 14B, when RIP processing of the job is completed to the last page (S213), the system configuration controller 14b determines whether or not there is a page for which the RIP processing performance of the RIP module or modules 16 is insufficient (S214), hereinafter such a page being referred to as a performance-insufficiency page. Specifically, when $p_{max}$ indicates a certain page, it is determined that there is a performance-insufficiency page. When $p_{min}$ indicates a certain page, it is determined that there is a page for which the RIP processing performance of the RIP module or modules 16 is surplus. When any of $p_{max}$ and $p_{min}$ does not indicate a certain page, it is determined that the throughput of the RIP module or modules 16 currently available is appropriate.

When it is determined that there is a performance-insufficiency page, the smallest number n of RIP modules to be added is calculated from an inequality $$T(p_{max}) \times (r/(r+n)) \leq s \times p_{max} \times (1-m) \quad (S215).$$

In contrast, when it is determined that there is a page for which the RIP processing performance of the RIP module or modules 16 is surplus, the greatest number n of RIP modules possible to be removed is calculated from an inequality $$T(p_{min}) \times (r/(r-n)) \leq s \times p_{min} \times (1-m) \quad (S216).$$

In the case where the number of RIP modules to be added or to be removed is calculated, as illustrated in FIG. 10 or 11, the number of RIP modules to be added or to be removed is displayed on the UI screen 12a and a user is led to perform an operation.

Note that exemplary embodiments of the present invention is not limited to the above-described exemplary embodiment. Various modifications may be made.

For example, the system configuration controller 14b of the CEP module 14 may calculate a processing speed in the case of addition of an RIP module 16 and may display, on the UI screen 12a, which controller is preferably used in terms of specifications as a result of estimation. In this case, a certain hardware configuration that is appropriate in terms of cost is preferably selected in accordance with information on the specifications of controllers and their prices, and displayed. Since the information on cost may change constantly, a price table in the system may be updated by constantly downloading data from a network.

In addition, although it is assumed that in-advance RIP is unnecessary in this exemplary embodiment, a technology that enables arbitrary addition or removal of an RIP module 16 and a BEP module 18 and enables execution of in-advance RIP as necessary may be included in exemplary embodiments of the present invention. One feature of an exemplary embodiment of the present invention is that the system configuration controller 14b determines whether or not the throughput of an RIP module or modules or that of a BEP module or modules is insufficient or surplus in accordance with the output speed of the printer device 20, displays information on addition or removal on the UI screen 12a in accordance with this determination result, and helps a user (an operator) to perform an operation for changing a system configuration. Arbitrary modifications may be performed within the scope of this technology.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing system comprising:
a first module that receives job data and controls a printing processing process;
a second module that converts the job data into image data;
a third module that converts the image data into data in a format appropriate for printing;
a printer that receives the data from the third module and performs printing;
a system configuration controller used to share system configuration information among the first, second, and third modules; and
a display controller that displays a state of the printing system in accordance with the system configuration information and receives an addition instruction for adding or a removal instruction for removing at least one of the second module and the third module from a user, the system configuration controller having the system configuration information,
wherein the system configuration controller executes addition or removal of a certain module among the second and third modules in accordance with the addition instruction or the removal instruction received by the display controller.

2. The printing system according to claim 1, wherein the second module includes a plurality of second modules, and the system configuration controller monitors processing load of the plurality of second modules and assigns processing to a certain second module having a relatively low processing load among the plurality of second modules.

3. The printing system according to claim 2, wherein
the system configuration controller acquires module information on another system connected via a network, and
the display controller displays module information on the printing system and the module information on the other system together and receives, from a user, an instruction for moving a module between different systems.

4. The printing system according to claim 2, wherein
in the case where it is determined that throughput of the second module is insufficient in accordance with a processing time of the second module and an output speed of the printer, the system configuration controller calculates the number of second modules to be added, which represents an insufficient amount of throughput, and
the display controller displays the calculated number of second modules.

5. The printing system according to claim 4, wherein
the system configuration controller calculates, as the number of second modules to be added, a minimum integer n that satisfies $T(p_{max}) \times (r/(r+n)) \leq s \times p_{max} \times (1-m)$, where r represents the current number of second modules, $T(p)$ represents a time necessary for processing of page 1 to page p, s represents a time necessary for the printer to output one page, $p_{max}$ represents a page whose delayed processing time $T(p)-s \times p$ is greatest among pages whose $T(p)$ is greater than $s \times p$, and m represents a margin.

6. The printing system according to claim 2, wherein
in the case where it is determined that throughput of the plurality of second modules is surplus in accordance with a processing time of the plurality of second modules and an output speed of the printer, the system configuration controller calculates the number of second modules to be removed, which represents a surplus amount of throughput, and
the display controller displays the calculated number of second modules.

7. The printing system according to claim 6, wherein
the system configuration controller calculates, as the number of second modules to be removed, a maximum integer n that satisfies $T(p_{min}) \times (r/(r-n)) \leq s \times p_{min} \times (1-m)$, where r represents the current number of second modules, $T(p)$ represents a time necessary for processing of page 1 to page p, s represents a time necessary for the printer to output one page, $p_{min}$ represents a page whose surplus processing time $s \times p - T(p)$ is smallest among pages whose $T(p)$ is smaller than $s \times p$, and m represents a margin.

8. The printing system according to claim 1, wherein
the system configuration controller acquires module information on another system connected via a network, and
the display controller displays module information on the printing system and the module information on the other system together and receives, from a user, an instruction for moving a module between different systems.

9. The printing system according to claim 1, wherein
in the case where it is determined that throughput of the second module is insufficient in accordance with a processing time of the second module and an output speed of the printer, the system configuration controller calculates the number of second modules to be added, which represents an insufficient amount of throughput, and
the display controller displays the calculated number of second modules.

10. The printing system according to claim 9, wherein
the system configuration controller calculates, as the number of second modules to be added, a minimum integer n that satisfies $T(p_{max}) \times (r/(r+n)) \leq s \times p_{max} \times (1-m)$, where r represents the current number of second modules, $T(p)$ represents a time necessary for processing of page 1 to page p, s represents a time necessary for the printer to output one page, $p_{max}$ represents a page whose delayed processing time $T(p)-s \times p$ is greatest among pages whose $T(p)$ is greater than $s \times p$, and m represents a margin.

11. A printing system comprising:
a first module that receives job data and controls a printing processing process;
a plurality of second modules that convert the job data into image data;
a plurality of third modules that convert the image data into data in a format appropriate for printing;
a printer that receives the data from the plurality of third modules and performs printing;
a system configuration controller used to share system configuration information among the first, second, and third modules; and
a display that displays a plurality of groups each of which includes a first module, a plurality of second modules, and a plurality of third modules in accordance with the system configuration information, the system configuration controller having the system configuration information; and
an instruction receiving unit that receives, in a case where a drag operation is performed by a user on at least any of a plurality of second modules and a plurality of third modules included in a first group displayed on the display and a drop operation is performed on the dragged module in a region where a second group is displayed on the display, a removal instruction for removing the dragged module included in the first group from the first group and an addition instruction for adding the dragged module to the second group, wherein the system configuration controller executes addition or removal of the dragged module in accordance with the addition instruction or the removal instruction received by the instruction receiving unit.

12. A printing method comprising:

receiving job data and controlling a printing processing process, using a first module;

converting the job data into image data, using a second module;

converting the image data into data in a format appropriate for printing, using a third module;

receiving the data from the third module and performs printing, using a printer;

sharing system configuration information among the first, second, and third modules, using a system configuration controller; and displaying a state of the printing system in accordance with the system configuration information, which the system controller has, and receiving an addition instruction for adding or a removal instruction for removing at least one of the second module and the third module from a user, using a display controller, wherein addition or removal of a certain module among the second and third modules is executed using the system configuration controller in accordance with the addition instruction or the removal instruction received by the display controller.

* * * * *